UNITED STATES PATENT OFFICE.

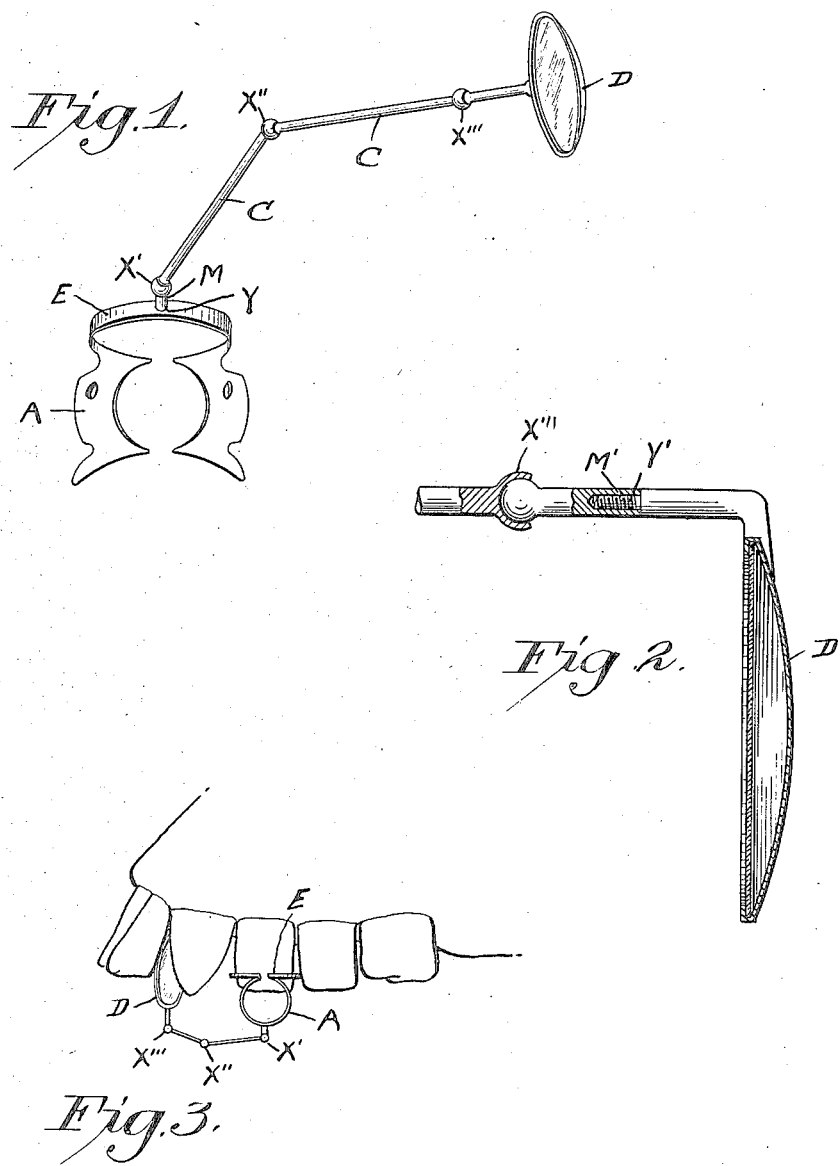

FREDERICK M. DIMAS, OF BALTIMORE, MARYLAND.

DEVICE FOR ADJUSTABLE MOUTH-MIRRORS.

1,397,090.  Specification of Letters Patent.  Patented Nov. 15, 1921.

Application filed December 16, 1920. Serial No. 431,309.

*To all whom it may concern:*

Be it known that I, FREDERICK M. DIMAS, a citizen of the United States, residing in the city of Baltimore and the State of Maryland, have invented a new and useful Improvement in Devices for Adjustable Mouth-Mirrors, of which the following is a specification.

My invention relates to improvements in dental mouth mirrors, consisting of three (3) principal parts; clamp, brace and mirror; and the objects of my improvement are; 1st to enable the operator to have a definite non-moving view of the object, 2nd to enable the operator to work freely, and 3rd it gives the use of both hands to the operator.

I attain these objects by the mechanism illustrated in the drawing, in which are plainly seen the three different parts of the device which is specified below; *i. e.:*

A regular rubber dam tooth clamp to be attached to any tooth in the mouth (incisors excluded), preferably a molar clamp with attachment at the bridge of the clamp E for a brace to be screwed in.

The brace consists of three equal parts of about one inch in length each, connected with ball and socket joints $x'$, $x''$, $x'''$, and ending in a screw, both ends $y$ and $y'$ to be attached to clamp (A) and mirror respectively. At screw sockets $m$ and $m'$ the joints are made exactly to provide a turn at any angle.

D is a regular mouth mirror, number three (3) preferred, so that it will be just large enough to see into plainly. It can be used plain or magnifying with attachment $y'$ to be screwed in bracket at $m'$.

I am aware that prior to my invention mouth mirrors have been attached to the teeth, but it did not enable the operator to use both of his hands while working in the mouth, and therefore;

I claim:

The combination of the rubber dam clamp, the three universally jointed arms connected thereto and the mirror attached by a screw to the outer arm, all as and for the purpose described.

FREDERICK M. DIMAS.